Nov. 21, 1939. W. E URSCHEL 2,180,568
MACHINE FOR PICKING COTTON
Filed April 23, 1937 5 Sheets-Sheet 2
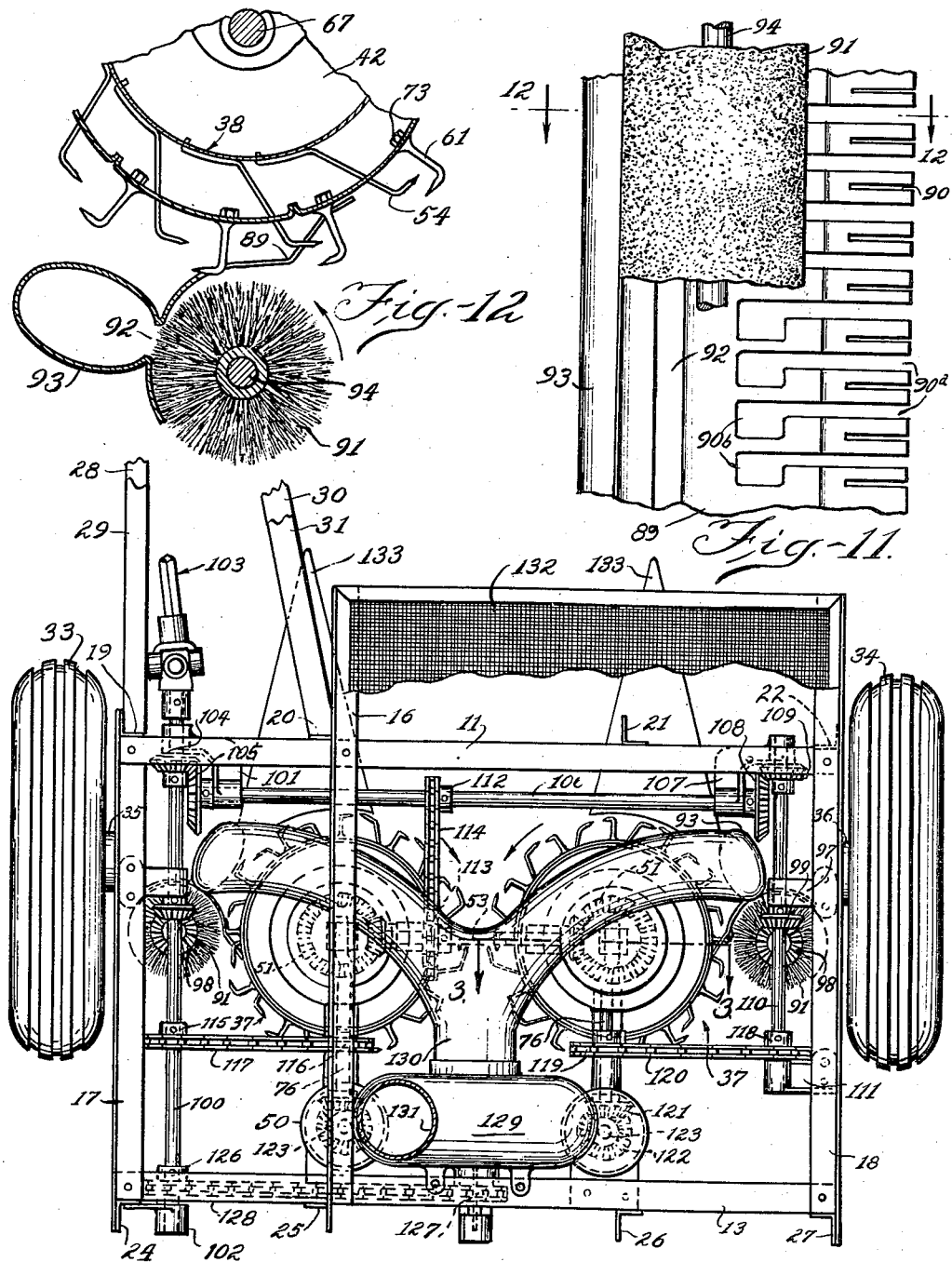
Fig. 12
Fig. 11
Fig. 2
INVENTOR.
William E. Urschel.
BY 
ATTORNEY.

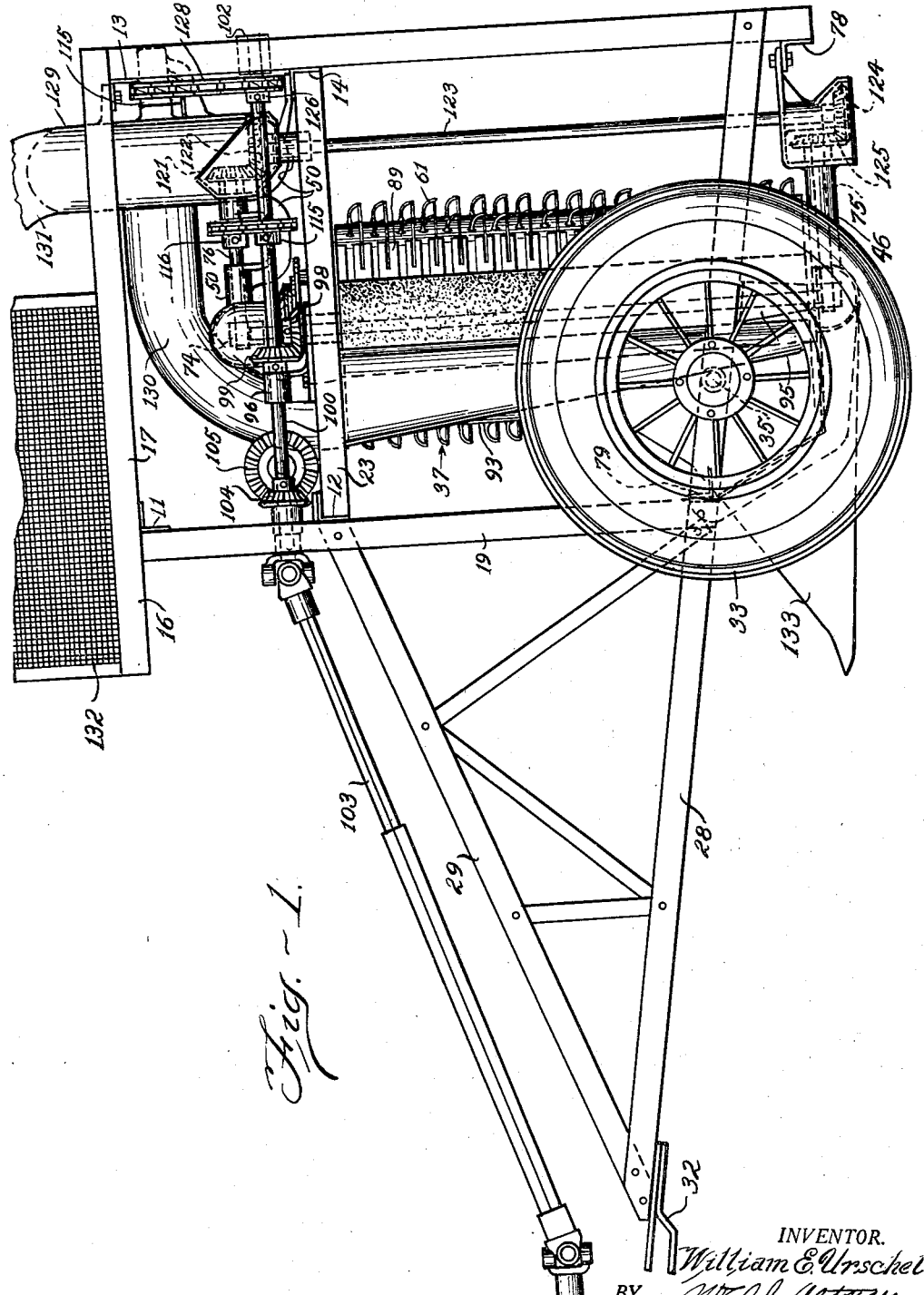

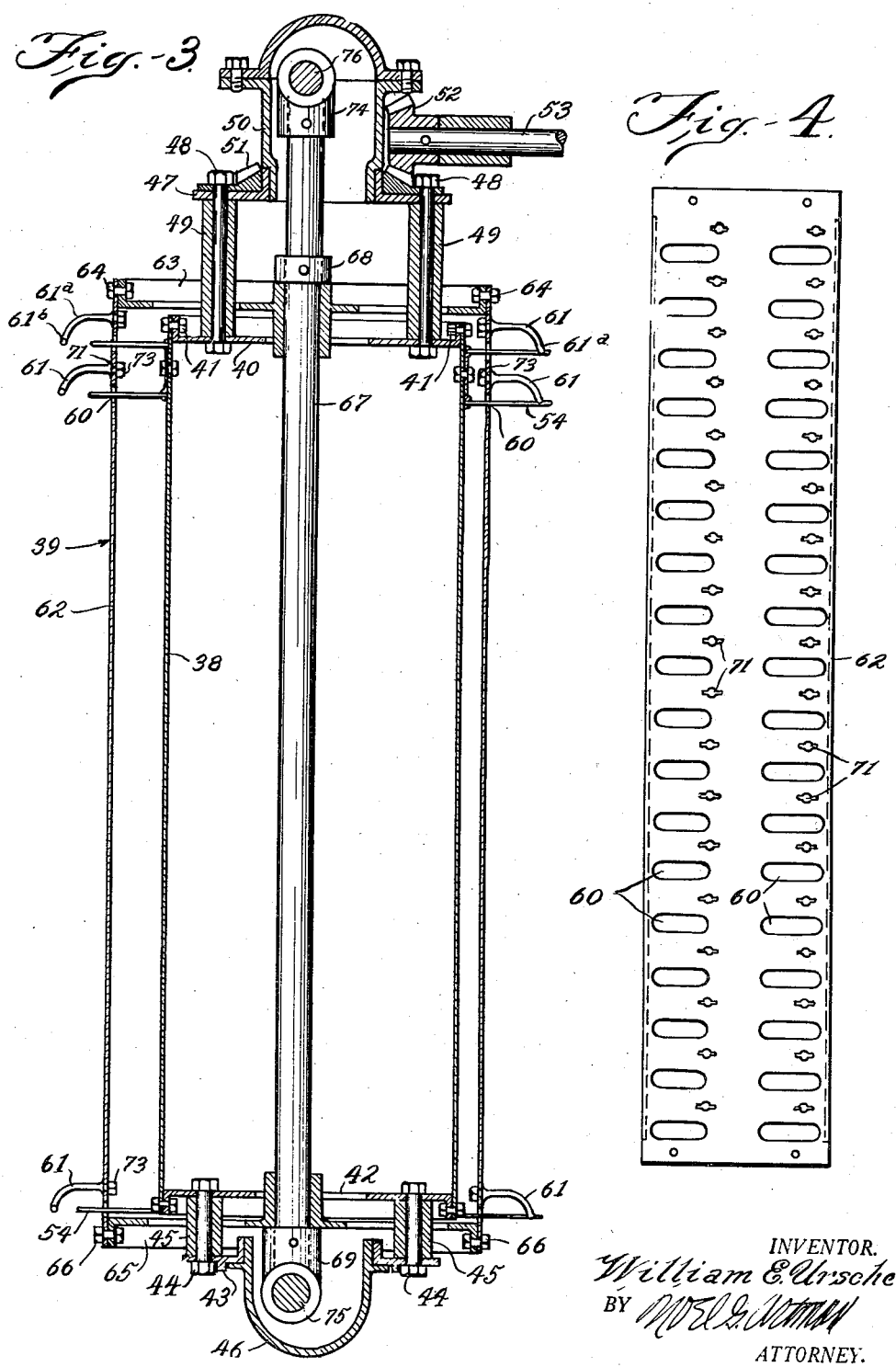

INVENTOR.
William E. Urschel
BY
ATTORNEY

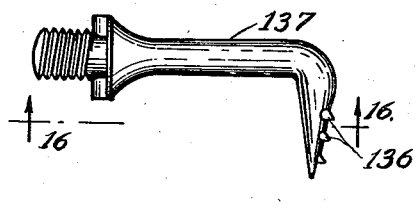
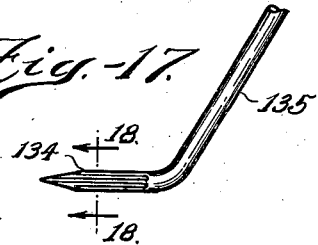
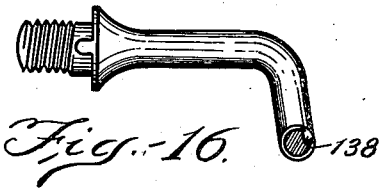
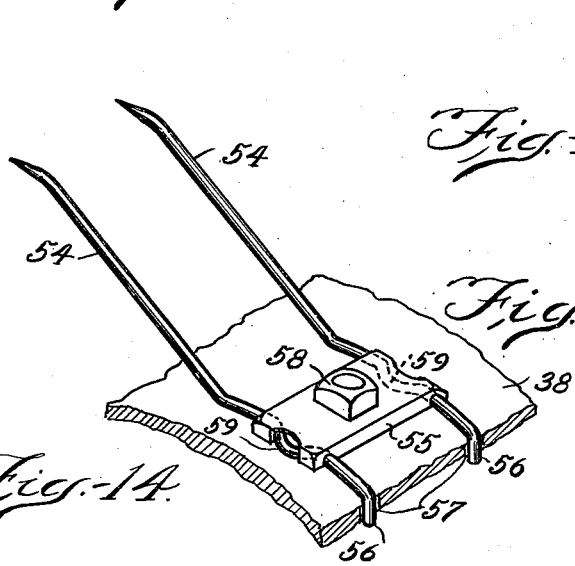
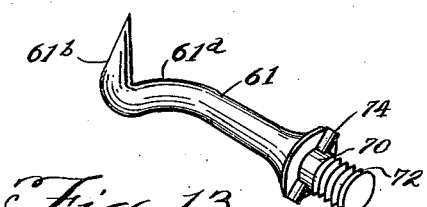

Patented Nov. 21, 1939

2,180,568

UNITED STATES PATENT OFFICE 2,180,568

MACHINE FOR PICKING COTTON

William E. Urschel, Valparaiso, Ind.

Application April 23, 1937, Serial No. 138,545

21 Claims. (Cl. 56—40)

This invention relates to improvements in the art of picking cotton from the plants in the field and has to do more particularly with a new machine for and method of engaging the crop by means of complementally moving parts or fingers for extracting it from the burs.

A machine constructed in accordance with the present invention is adapted to travel down a single crop row and remove or pick the seed cotton from the burs, leaving the stalks and green bolls undamaged, the picked seed cotton being conveyed to a suitable container from which it may be later removed.

Thus far in the development of cotton picking machinery, some of the most practicable machines have employed an endless carrier movable through a predetermined path while successively presenting picking devices toward the cotton plants. These carriers and picking devices have included a multitude of moving parts and bearings, thus making the machines extremely complicated, and since lubricating oils may be used in only such a sparing manner as to insure none coming in contact with the cotton crop, these bearings become impaired more quickly than if they could be freely lubricated.

One of the primary objects of the present invention is the provision of a cotton picking machine, including a new picker carrier or drum structure wherein the number of relatively moving parts is tremendously diminished.

More specifically, the objects of the present invention embrace the provision in a cotton picking machine of:

A novel mechanical movement of paired complemental picker fingers;

An improved arrangement of picker fingers in sets of which the fingers of each set cooperate individually with certain fingers of the other set;

A new picker drum structure embodying sets of picker fingers, and wherein the fingers of one set are cooperatively moved relatively to the fingers of another set but without relative movement occurring between the fingers within either of such sets;

An improved combination of brush and stripping plate for extracting the plucked crop from the picker fingers;

Picker fingers of a new and novel shape; and

A new process of clutching and plucking cotton from the plant bur by means of a winding action upon the cotton.

Other objects of the invention will become apparent upon reading the following description in conjunction with the accompanying five sheets of drawings hereby made a part of this specification, and wherein:

Fig. 1 is a side elevation of one form of machine constructed in accordance with the principles of the present invention;

Fig. 2 is a plan view of the machine with a part of the crop receiving receptacle shown broken away for clarity;

Fig. 3 is a cross sectional view through the picking drum structure of the machine, and taken on line 3—3 of Fig. 2;

Fig. 4 is a side elevation of one of several curved plates which make up the outer picker drum;

Fig. 11 is a fragmentary side view of a brush and stripper plate for removing the cotton from picker fingers of the machine;

Fig. 12 is a view taken in cross section on the line 12—12 of Fig. 11;

Fig. 13 is a perspective view illustrating in detail one of the rigid picker fingers which are used upon the outer drum of the present drum structure;

Fig. 14 is a view in perspective of one of the spring picker fingers which are used upon the inner drum of the present drum structure;

Fig. 15 shows a modified form of rigid picker finger with hooks on the portion for engaging the cotton;

Fig. 16 is a sectional view of the rigid picker finger shown in Fig. 15 and is taken on line 16—16 of Fig. 15;

Figure 7:
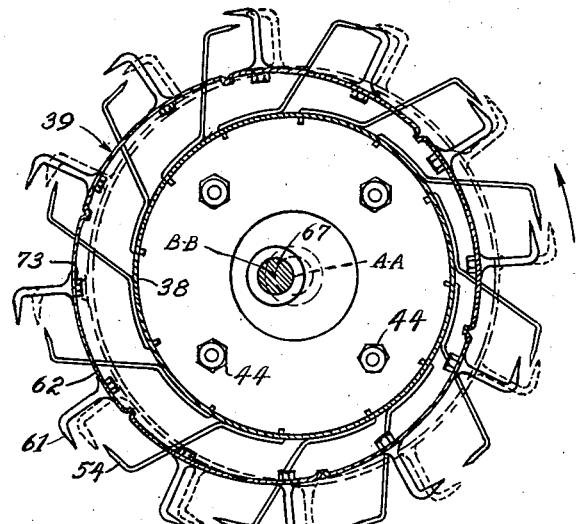
Fig. 7 is a view looking axially downwardly at a section taken transversely of the drum structure as shown in Fig. 6.

Figs. 17 and 18 show a grooved type of spring picker finger, the view of Fig. 18 being taken on the line 18—18 of Fig. 17; and Figs. 19, 20 and 21 are diagrammatical views showing the progressive action of the picker fingers on the cotton within a bur.

The same reference characters are used for designating identical parts shown in various figures of the drawings and described hereinafter.

Reference should first be had to Figs. 1 and 2 where the box-like frame on which the drive is supported will be seen to include four transverse pieces 11, 12, 13 and 14, which may be appropriate lengths of angle iron. The members 11 and 13 are held in spaced relation by longitudinal frame members 16, 17 and 18. Vertical frame members 19, 20, 21 and 22 are secured at their upper ends to transverse frame member 11. Frame member 12, which is coextensive with member 11, is fastened to members 19, 20, 21 and 22. A longitudinal frame member 23 is secured to and extends between the left hand ends of members 12 and 14. A right hand longitudinal frame member (not visible in the drawings) corresponding to member 23 is secured to and between the opposite ends of the transverse frame members 12 and 14. Vertical frame members 24, 25, 26, and 27 are secured at their upper ends to transverse frame member 13 and project downwardly into connected engagement with transverse frame member 14. Longitudinal frame members 28 and 29 which are secured to vertical frame member 19 and longitudinal frame members 30 and 31 which are fixed to vertical frame member 20, project forwardly and terminate at a clevis 32. Said clevis 32 which is secured to longitudinal frame members 28, 29, 30, and 31, is adapted to engage the drawbar of a tractor which may furnish the motive power for the cotton picker. The frame is carried by wheels 33 and 34. Wheel 33 is rotatably mounted on a stub axle 35 which is securely bolted to longitudinal frame member 28. Wheel 34 is rotatably mounted on a stub axle 36 which is bolted or otherwise secured to a longitudinal frame member (not visible in the drawings) but which is securely fixed to the lower extremities of vertical frame members 22 and 27.

Picker drum structures generally designated 37 are mounted on the frame in such a manner that the row of plants bearing the cotton to be picked will be passed between such structures. Both drum structures are substantially alike, there being the difference that they are designed to rotate in opposite directions and consequently the picker fingers about their peripheries are turned in opposite directions. The same characters of reference will be applied to the corresponding parts of both drum assemblies or structures. Referring now to Figs. 3, 4, 5 and 7, wherein the right-hand drum assembly is shown, it will be seen that picker drum assembly consists of an inner drum 38 and an outer drum 39. The inner drum 38 has at its upper end a head 40 which is secured to such drum by bolts 41. Likewise at the lower end of the inner drum 38 there is secured a lower head 42. A lower bearing plate 43 is securely fixed to lower drum head 42 by bolts 44. Spacer sleeves 45 about the bolts 44 hold lower bearing plate 43 and lower drum head 42 in spaced relation. Lower bearing plate 43 is journalled on lower drum support member or compound bearing block 46. Similarly an upper bearing plate 47 is securely fixed to upper inner drum head 40 by bolts 48 and tubular spacers 49. The upper drive or bearing plate is journalled upon the lower end of a bearing bracket 50 which is fixed to the machine frame. A ring gear 51 secured to bearing plate 47 by the bolts 48 is driven by a pinion gear 52 which is pinned to a shaft 53. When power is applied to the shaft 53 the inner picker drum will be rotated. Spring picker fingers 54 are mounted at spaced intervals on inner drum by clips 55, as shown in Fig. 14. The fingers 54 are accurately positioned upon the inner drum by the insertion of bent shank portions 56 into drum apertures 57. Bolts 58 may be used for fastening the clips 55 in place upon the drum. Side loops 59 in the fingers 54 prevent twisting thereof. Fingers 54 extend through apertures 60 in the outer drum sections 62 in a manner enabling them to co-act with rigid fingers 61 in the picking of the cotton.

The outer drum is made up of a number of curved plate sections 62 connected to an upper outer drum head 63 by bolts 64 and to a lower outer drum head 65 by bolts 66, thus forming a rigid cylinder. The outer picker drum heads 63 and 65 are rotatably mounted on a rod 67 and are held against axial movement with respect to such rod by means of a collar 68 and a lower crank bearing 69. Picker fingers 61 are mounted on the outer picker drum by means of shanks 70 thereof projecting into drum apertures 71. Said shanks are threaded at 72, Fig. 13, to receive nuts 73 for holding the fingers 61 in place upon their drum. Fingers 61 are provided with lugs 74 to prevent them rotating within their respective apertures 71, the drum being suitably notched to receive the lugs at the edges of the apertures.

Upon the lower and upper ends of the rod 67 are placed crank rod bearing members 69 and 74. Said bearing members 69 and 74 are rotatably mounted on eccentric bearing portions of crank shafts 75 and 76 and are in support of the outer picker drum 39. The lower crank rod 75 is journaled in the bearing block 46 which is supported on lower transverse frame members 78 and 79, see Fig. 1. The upper crank shaft 76 is journalled in the picker drum support or compound bearing block 50 which is secured at the rear to transverse frame member 14 and at the front to transverse frame member 12.

Figure 6:
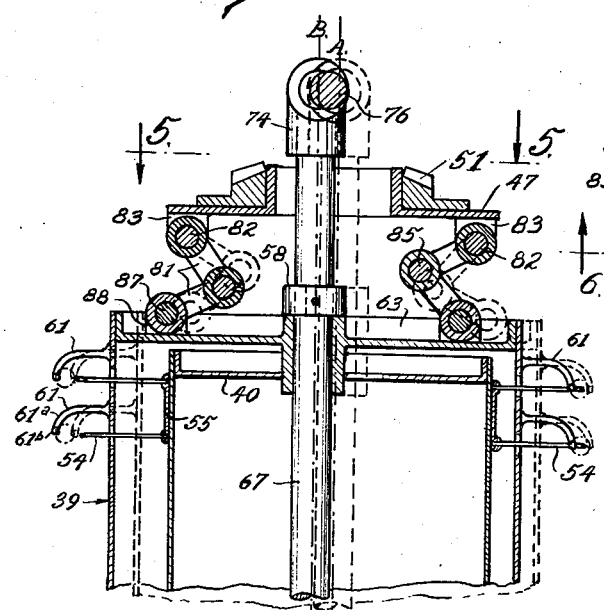
Fig. 6 is a fragmentary sectional view showing the upper part of the picker drum structure and taken on line 6—6 of Fig. 5. The drum structure as shown in Fig. 6 has been rotated ninety degrees from the position occupied in Fig. 3.
Figure 5:
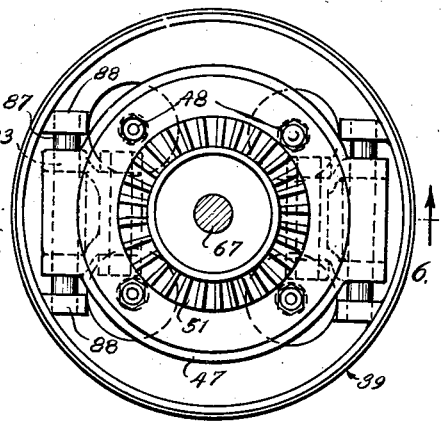
Fig. 5 is an end view of the picker drum structure embodied in the machine illustrated in the above figures, the view being taken on the line 5—5 of Fig. 6.
Figure 8:
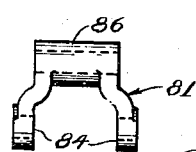
Fig. 8 shows in detail one of the driving links for the outer drum of the picker drum structure.

Reference should now be had to Figs. 5, 6 and 8. The outer picker drum 39 is revolved about the rod 67 by upper bearing plate 47 by means of a pair of driving hinges or linkages made up of links 81. Pins 82 are secured in lugs 83 which project downwardly from the upper bearing plate 47. Bearing sections 84 of the links 81, Fig. 8, are journalled on the pins 82. The paired links 81 are hinged together by pins 85 and the bearing 86 of each of the lower links 81 is hinged about a pin 87, fixed in lugs 88 projecting upwardly from upper picker drum head 63. The ears 88 are spaced apart sufficiently, Fig. 5, to provide clearance between their opposed inner faces and the bearing 86 of the link 81 therebetween, thus enabling the pin 87 to slide endwise in the bearing 86 and permitting movement of the drum 39 relatively to plate 47 at right angles to the direction permitted by the pivotal character of the linkage, and thereby providing for a form of universal movement between the drum 39 and the plate 47 from which rotative force is received. This construction permits the upper bearing plate 47 to revolve the outer picker drum about rod 67 and yet allows the outer picker drum to follow the circular motion imparted to rod 67 by the cranks 75 and 76 within a vertical plane.

From the aforesaid description it will be noted that there are two distinct motions of the outer and inner picker drums. First there is the rotating motion of the entire picker drum assembly as a unit about the vertical axis A—A, Figs. 6 and 7, of the inner picker drum. The direction of rotation is indicated by arrows in Figs. 2 and 7. Second, there is the vertical circular motion imparted by the cranks 75 and 76 to the outer picker drum in a plane at right angles with respect to the forward direction the machine travels while in operation. This vertical circular motion causes every point on the outer picker drum to travel in a small circular path, the radius of such path being determined by the offset of the cranks 75 and 76. In Figs. 6 and 7 it may be seen that shaft 67 is moved laterally as well as axially by the cranks 75 and 76 between axial centers A—A and B—B which are, respectively, concentric and eccentric relatively to the inner drum 38 and the central bearing in plate 47. Consequently the field within which the outer drum moves circularly within a vertical plane is displaced toward one side only of the inner drum; viz., the ever-changing side which is disposed outwardly of the machine. The left side of the drum structure as shown in Figs. 6 and 7 constitutes the outer side as installed on the machine. In Fig. 6 the end sections of fingers 61 are shown at the right side of the drum structure, the side presented next to the crop when the machine is in operation, to describe a circular path substantially concentrically of the paired end sections of the fingers 54 in juxtaposition thereto. Such movement of the fingers 61 enables them to impale and hook the crop while projected beyond the fingers 54 and to wind the hooked crop about fingers 54 as the movement thereabout is continued. It will be further seen in Fig. 6 that the end sections of fingers 61 at the left or outer side of the machine are separated from the end sections of the adjacent fingers 54 such a distance as to describe their circular paths beyond and out of cooperative relationship with fingers 54. The outer side of the drum structure is in registry with stripping mechanism, hereinafter described, for extracting the cotton therefrom. Such stripping operation is facilitated by the sets of picker fingers being separated while at the outer side of the machine. As a summary of the immediate foregoing it may be stated that the mounting of the outer cylinder so it moves between positions of concentricity and eccentricity of the inner drum, provides for the spring picker fingers 54 and the rigid picker fingers 61 to assume the proper relation with each other for picking action on the side of the drum structure next to the cotton, while on the side away from the cotton the end sections of the fingers 54 and the fingers 61 are separated as an incident to releasing the picked cotton.

Attention is invited to Fig. 2 and particularly to Figs. 11 and 12 where is shown apparatus for stripping the cotton from the picker fingers. Figs. 11 and 12 disclose details of the left-hand stripper apparatus. Slots 90 of the stripper plate 89 are relatively narrow because they are located in registry with fingers 54 which have no component of motion axially of the drum assembly. Slots 90a on the other hand, must be wide to enable them to receive picker fingers 61 which have a vertical component of motion. The fingers 61 accommodated by the slots 90a co-act with fingers 54 aligned with slots 90 respectively immediately below such slots 90a. Fingers 61 will be seen in Figs. 3, 6, and 13 to have an angular section 61a depending downwardly so as to present the end portion 61b thereof for cooperation with a finger 54 anchored at a slightly lower position on the drum structure. The enlarged sections 90b of slots 90a are provided to permit the depending parts 61a and 61b of the fingers 61 to pass the plate 89. Now it will be noticed, Fig. 12, that the cotton carried upon the fingers approaching the stripper plate 89 will first be stripped from the ends of fingers 54 as they pass through the shorter slots 90, thus leaving the cotton on the end sections 61b of the trailing complemental fingers 61. End sections 61b of fingers point in the same direction as is the movement of the side of the brush 91 adjacent thereto, and since the peripheral speed of the brush exceeds that of the drum structure carrying the fingers 61, the cotton will be brushed therefrom, and without interference of the fingers 54 which are then separated from the cotton by the stripper plate 89. As the cotton is collected by doffer brushes 91 it is carried to the openings 92 of the suction tubes 93 into which it passes. Doffing brushes 91 are mounted securely on shafts 94. Such shafts 94 are journalled at their lower ends in bearing brackets 95, of which one is shown in Fig. 1. Said brackets 95 are bolted respectively to the longitudinal frame member 28 and a corresponding but shorter member (not shown) on the opposite side of the machine frame. The upper ends of shafts 94 are journalled in bearing brackets 96 and 97, which are suitably bolted to the machine frame, Figs. 1 and 2.

A bevel gear 98 pinned to the left shaft 94, Fig. 2, is driven by a bevel gear 99 which is secured to a shaft 100. Shaft 100 is journalled in the bearing bracket 96 and in one section of a bearing bracket 101 which is bolted to transverse frame member 12. The rear end of shaft 100 is journalled in a bearing bracket 102. A conventional universal joint assembly 103 is secured to the forward end of shaft 100 and transmits power thereto from the power take-off of the tractor. Gear 104 pinned to shaft 100 drives a gear 105 which is fixed to a shaft 106. Shaft 106 is journalled in bearing brackets 101 and 107 which are bolted to transverse frame member 12. Gear 108 pinned to shaft 106 drives a gear 109 which in turn drives a shaft 110. Said shaft 110 is journalled in bearing brackets 107, 97 and 111, Fig. 2. Right-hand gear 99 secured to shaft 110 drives right-hand gear 98, thus driving the right-hand doffing brush 91 as hereinabove described with respect to the left-hand brush 91. A sprocket 112 secured to shaft 106 drives a sprocket 113 through a chain 114. Sprocket 113 is fixed to the shaft 53 which drives gears 51 thus revolving the picker drums as heretofore explained, see Figs. 2 and 3.

A sprocket 115 pinned to shaft 100 drives a sprocket 116 through a chain 117. Sprocket 116 is secured to the left-hand crank shaft 76, Figs. 1 and 2, and imparts rotary motion to such shaft. In a similar manner shaft 110 drives the opposite or right-hand crank shaft 76 through sprockets 118 and 119 and a chain 120. Bevel gears 121 fixed to crankshafts 76 drive bevel gears 122 which are secured to vertical shafts 123. Said shafts 123 are journalled at their upper ends in suitable bearings within the upper picker drum or bearing brackets 50, and at their lower ends within lower picker drum supports or bearing brackets 46, of which the left-hand one is shown in Fig. 1. Bevel gears 124 pinned to shafts 123 drive bevel gears 125 which are secured to lower crankshafts 75, thus the lower crankshafts 75 and the upper crankshafts 76 are driven in timed action.

An exhaust fan device generally designated 129, mounted on transverse frame members 13 and 14, is driven from shaft 100 by means of sprockets 126 and 127 and chain 128. The cotton is sucked upwardly through the suction tubes 93 and the Y-shaped suction pipe 130, and is finally discharged by the fan through a pipe 131 into a suitable receptacle 132 mounted on longitudinal frame members 16 and 18.

Curved shoes 133 secured to the frame members 20 and 21 serve to guide the stalks of the cotton plants between the picking drums.

In its operation the cotton picking machine is preferably attached to any conventional farm type tractor which is guided down the row of cotton to be picked. As the machine is propelled the cotton stalks will pass between the two picker drum assemblies 37, of which the rotational speed is so regulated that their peripheries will be moving at a curvilinear speed substantially equal to the forward vehicular speed of the machine. As a consequence of this speed regulation, the picking fingers on the opposed sides of the drum assemblies will be moving rearwardly, with respect to the machine, at the same speed at which the machine advances through the field, and so such inwardly disposed fingers will have substantially no speed relatively to the ground and will be adapted to engage the crop while stationary with respect thereto. It follows that the burs of the individual stalks will be operated upon by a single pair of picking fingers. As the rigid picker fingers 61 in contiguity with the seed cotton move in a circle about the spring picker fingers 54, a wrapping action is set up whereby the cotton is wrapped tightly about the picker fingers 54 in the manner illustrated in the diagrammatical Figs. 19, 20 and 21. The picker fingers 54 are preferably made of spring wire in order that said fingers may adjust themselves to the amount of cotton wrapped thereon. Later, while the picker fingers are being moved away from the stalks, the seed cotton is pulled thereby from the boll and carried to the stripper plate and doffing brush apparatus where the cotton is removed from the picker fingers and conveyed by suction through the conduits 93, 130 and 131 into the receptacle 132.

Figure 10:
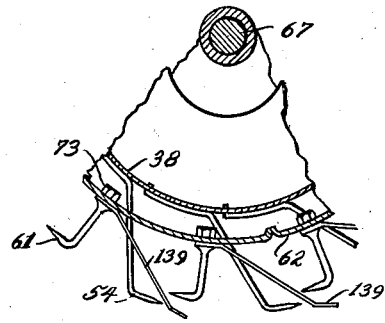
Fig. 10 is a fragmentary sectional view taken on line 10—10 of Fig. 9.
Figure 9:
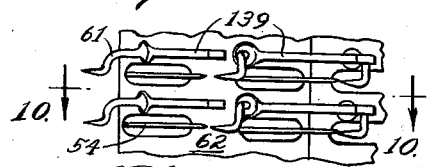
Fig. 9 is a fragmentary side view of a modified form of picker drum structure having guards for the picker fingers.

Under certain conditions it may be desirable to groove sections near the points of the spring picker fingers in some such manner as the grooves 134 upon the fingers 135 shown in Figs. 17 and 18. Fingers 135 correspond to fingers 54, Fig. 14. Hooks or barbs 136 may be attached to a modified form of rigid picker finger 137 shown in Figs. 15 and 16. Finger 137 is similar to fingers 61 in all respects excepting that it contains recesses 138 into which the barbs 136 may be inserted for anchorage. Also under certain conditions it may be desirable to add to the drum assembly guard fingers 139 as shown in Figs. 9 and 10. These guard fingers 139 are preferably made of spring metal and function to prevent the stalks of the cotton plants from getting between the sets of picker fingers. Said guard fingers 139 are relatively narrow so the cotton bolls may pass between them to be acted upon by the picker fingers. One method of attaching the guard fingers in position upon the drum assembly is to insert their shanks between the shoulders of the rigid picker fingers and the outer drum prior to tightening the nuts 73 upon the threaded ends of such picker fingers.

While the present invention has been described as it may be applied to a machine for picking cotton, it will be understood that the new principles herein disclosed may be embodied in other machine forms and applied to other uses without departing from the spirit of this invention. It is, therefore, intended that the scope of the invention shall be in nowise limited excepting as defined in the appended claims.

I claim:

1. A cotton picker machine comprising a movable picking means, means for moving said picking means in a selected path relatively to said machine, an additional movable picking means cooperable with the first named picking means, and means for moving said additional picking means relatively to and substantially transversely of the direction of movement of the first picking means and about said first picking means during movement of said first picking means through a portion of such path.

2. In a fibrous crop gathering machine, provided with a receiving space for crop bearing plants, carrier members, a pair of fingers disposed respectively upon said carrier members and each having a crop plucking section disposed for complemental operation with such section on the other finger, means for moving said carrier members to advance the finger sections through said space, and means for concurrently effecting a relative movement between said carrier members to cause at least one of said finger sections to revolve orbitally about the other in spaced relation therewith.

3. In a fibrous crop gathering machine provided with a receiving space for crop bearing plants, a pair of carrier members, a pair of fingers respectively upon said carrier members and each having a crop plucking end section turned substantially oppositely to and disposed for complemental operation with such section on the other finger, means for moving said carrier members to advance the finger sections through said space, and means for concurrently effecting a relative movement between said carrier members to cause at least one of said finger sections to revolve orbitally about the other in spaced relation therewith.

4. A cotton picking machine comprising a plurality of picker fingers, a carrier for said fingers and operable to carry said fingers through a predetermined path relatively to said machine, a plurality of wrapping fingers respectively associated with said picker fingers, and means for moving said wrapping fingers relatively to and about their respectively associated picker fingers during movement of said picker fingers through said path.

5. A crop picking machine comprising a rotatable carrier, a plurality of picker members on said carrier, a second carrier rotatable substantially coaxially with the first carrier, means for rotating said carriers, rotatable power transmitting means, bearing means disposed on and eccentrically of said power transmitting means, said bearing means providing support for the second carrier during such rotation, said power transmitting means being rotatable for displacing said second carrier in a closed path within a plane in parallelism with and substantially coincident with the rotational axis thereof, and additional picker members respectively associated with the first named picker members, said additional picker members being on the second carrier in such positions that the displacement of said carrier moves them about their respectively associated members.

6. Cotton picking apparatus comprising inner and outer carriers journalled for rotation about substantially parallel axes, separate journal means for said carriers, means for rotating said carriers in their journal means, a crank rotatable about an axis normal to the axes of said carriers, the journal means for one of said carriers being disposed upon the throw bearing of said crank, means for rotating said crank for imparting to said one of the carriers a circular movement in addition to the rotative movement thereof, and adjacently disposed complemental picker fingers respectively on said carriers, said picker fingers being so relatively disposed that during a portion of the rotation of the carriers the circular movement of the one carrier advances the picker finger thereon about the other picker finger with a winding motion.

7. A crop picking machine comprising an endless carrier rotatable to horizontally advance the outer face of a section thereof relatively to said machine and into adjacent opposed relation with such crop, means for rotating said carrier, crop picker fingers on said face of the carrier, there being oversize openings in said carrier section respectively associated with said picker fingers, a second carrier within the first carrier, additional picker fingers on the second carrier, said additional fingers projecting through the openings of the first carrier into respective complemental relation with the first named picker fingers, bearing means supporting the second carrier for rotation about a vertical axis, means for rotating said second carrier in said bearing means, a crank rotatable about a horizontal axis, said bearing means being disposed upon the throw bearing of said crank, and means for rotating said crank to impart to the second carrier a circular movement in addition to its rotative movement so as to move the fingers thereon circularly about their respective complemental fingers on said section of the first carrier.

8. In a cotton picking machine having a picking section and a stripping section, a rotatable carrier, means for rotating said carrier, a picker finger on said carrier and alternately presented thereby during rotation thereof to said picking and stripping sections, a second rotatable carrier, bearing means wherein the second carrier is rotatable about an axis substantially parallel with the rotational axis of the first carrier, crank means rotatable about an axis disposed normally to the rotatational axes of said carriers and provided with throw bearing means in support of the bearing means for the second carrier, means for rotating the second carrier at the same speed as the first carrier, means for rotating said crank means for imparting a circular movement to the second carrier in addition to and at greater angular velocity than its rotational movement, the second carrier being shifted by such circular movement between a position of substantial concentricity with the first carrier and a position nearer the picking section of the machine and more distant from the stripping section of the machine, and a picker finger on the second carrier, the last named picker finger being disposed such a distance radially of the second carrier that the circular movement thereof carries said finger circularly about the first named finger while said fingers are at the picking section of the machine and that said last named finger overreaches the first named finger radially of the carriers while said fingers are at the stripping section of the machine.

9. In a picker machine, a carrier having a peripheral section disposed in an endless path defined thereby, means for rotating said carrier for advancing said peripheral section through such path, a picker finger on said peripheral section and having an end portion directed rearwardly with respect to the direction of said section is advanced, a second carrier about the first named carrier, means for rotating the second carrier at the same speed as the first carrier, a picker finger on the second carrier and having an end portion disposed in close proximity with and directed oppositely to the end portion of the first named finger, crank means having a throw bearing in support of one of said carriers, and means for rotating said crank means for imparting to said one of the carriers and the finger thereon a circular movement whereby the end portion of said finger is moved circularly about the end portion of the other of said fingers.

10. A picker machine comprising inner and outer carriers, means for rotating said carriers at the same speed about their principal axes, picker fingers disposed on the outer side of each of said carriers, the picker fingers on the inner carrier having horizontal end portions turned at right angles to the axis of such carrier and disposed at the same radial distance from such axis, the picker fingers on the outer carrier also having horizontal end portions turned at right angles to the axis of their carrier but turned oppositely to the end portions of the fingers on the inner carrier and spaced from their carrier axis a different radial distance than the corresponding radial spacing of the finger end portions on the inner carrier, the finger end portions on the inner carrier being adjacent to and respectively paired with the finger end portions on the outer carrier, and crank means supporting one of said carriers and rotatable about an axis substantially normal to the carrier axes, such crank being disposed so the throw bearing thereof is movable to displace the carrier thereon both radially and axially of the other carrier while moving the finger end portions on a section thereof circularly about the finger end portions respectively paired therewith.

11. A machine as set out in claim 10 and wherein the end portions of the fingers on the carrier supported by the crank means are off-set vertically from their shanks.

12. A picker machine comprising inner and outer rotatable carriers, means for rotating said carriers at the same speed about their principal axes, picker fingers disposed on the outer side of each of said carriers, the picker fingers on the inner carrier having horizontal end portions turned substantially at right angles to the axis of such carrier oppositely to the direction of rotation thereof and disposed at the same radial distance from such axis, the picker fingers on the outer carrier also having horizontal end portions but turned oppositely to the finger end portions on the inner carrier and spaced equally from the axis of their carrier a greater radial distance than the corresponding radial spacing of the finger end portions on the inner carrier, said finger end portions on the outer carrier being off-set vertically from shanks of their respective fingers into adjacent individually paired relation with the finger end portions on the inner carrier, and crank means supporting the outer carrier and rotatable about an axis substantially normal to the carrier axes, said crank means being disposed so the throw bearing thereof is movable to displace the outer carrier thereon both radially and axially of the inner carrier while moving the finger end portions on a section of said outer carrier circularly about the inner carrier finger end portions paired therewith.

13. In a crop gathering machine, instrumentalities relatively movable for cooperatively clutching a crop, separate carriers upon which said instrumentalities are respectively mounted, means for rotating said carriers about substantially coincident vertical axes, said instrumentalities being mounted at vertically dis-aligned sections upon their respective carriers, at least one of said instrumentalities being vertically off-set from its mounting to compensate for such dis-alignment by projecting the end section thereof adjacently to the other of said instrumentalities, and crank means supporting one of said carriers and rotatable during rotation of said carriers to effect such relative movement to said instrumentalities.

14. The combination set out in claim 13, wherein one of the instrumentalities has an end section turned in the direction of its movement during rotation of the carriers and the other of said instrumentalities has an oppositely turned end section, and further including a stripping member provided with slots for respectively receiving said instrumentalities as an incident to the rotation of said carriers, and said slots being positioned so the oppositely turned instrumentality end section is received by its respective slot prior to reception of the other instrumentality end section by its respective slot.

15. The combination set out in claim 13, wherein one of the instrumentalities has an end section turned in the direction of its movement during rotation of the carriers and the other of said instrumentalities has an oppositely turned end section, and further including a stripping member provided with slots for respectively receiving said instrumentalities as an incident to rotation of said carriers, said slots being positioned so the oppositely turned instrumentality end section is received by its respective slot prior to reception of the other instrumentality end section by its respective slot, a doffer brush for stripping the crop from said other instrumentality end section, said doffer brush being disposed adjacently to the side of said stripping member toward which said instrumentalities approach, and means for moving said brush in the direction of movement of said instrumentalities but at greater speed.

16. In a crop gathering machine having two sets of picking instrumentalities of which the instrumentalities in each set are adapted to cooperate with those in the other set when selectively moved relatively thereto, inner and outer rotatable carriers upon which said sets are respectively disposed, said instrumentalities being upon the exterior of their respective carriers and the outer carrier being provided with oversize openings through which the instrumentalities on the inner carrier extend into respective cooperable relation with those on the outer carrier, the instrumentalities in one of said sets being disposed at a greater radial distance from the axis of their carrier than the corresponding radial spacing of the instrumentalities in the other of said sets, means for rotating said carriers, crank means supporting one of said carriers and rotatable about an axis substantially perpendicular to the axes of said carriers to move the instrumentalities on a section of said one carrier circularly about the instrumentalities respectively associated therewith on the other carrier.

17. In a crop gathering machine, a crop picker finger having a crop engaging end section, and at least one barb on said end section, said one or more barbs being directed angularly with respect to the principal axis of said end section and in the general direction of the end of said section.

18. In a crop gathering machine, a crop picker finger having a crop engaging end section, and crop retaining means on said end section, said crop retaining means being disposed to resist rotative movement of the crop about said end section while avoiding such resistance to movement of the crop axially of said end section.

19. In a crop gathering machine, a crop picker finger having a crop engaging end section, and crop retaining means on said end section, said crop retaining means being disposed to resist rotative movement of the crop about said end section while avoiding such resistance to movement of the crop axially of said end section toward the end thereof.

20. In a picker machine, a stripper plate having an edge containing a plurality of spaced-apart slots extending inwardly thereof, alternate ones of said slots being of greater width than the others and having near their innermost ends a laterally extending section.

21. In a machine adapted for picking a crop from among plant stems, paired spaced-apart instrumentalities relatively movable for plucking said crop, means for so moving said instrumentalities, and guard means disposed between said pairs of instrumentalities outwardly thereof toward said stems, said guard means being arranged transversely of the plant stems and being spaced apart a sufficient distance to permit projection of the crop therebetween into accessible relation with said instrumentalities.

WILLIAM E. URSCHEL.